United States Patent
Bondarowicz et al.

(10) Patent No.: US 6,176,665 B1
(45) Date of Patent: Jan. 23, 2001

(54) THREADED FASTENER AND ASSEMBLY

(75) Inventors: Frank A. Bondarowicz, Park Ridge; Ryan W. O'Nell, Evanston; James D. Jones, Barrington; William G. Stlaske, Elmhurst; Amy L. Williams, Chicago, all of IL (US)

(73) Assignee: Illinois Tool Works, Inc., Glenview, IL (US)

( * ) Notice: Under 35 U.S.C. 154(b), the term of this patent shall be extended for 0 days.

(21) Appl. No.: 09/489,558

(22) Filed: Jan. 21, 2000

(51) Int. Cl.[7] ............................ F16B 35/04; F16B 39/284
(52) U.S. Cl. ......................... 411/424; 411/187; 411/189; 411/399; 411/999
(58) Field of Search .................................. 411/155, 156, 411/186, 187, 189, 352, 353, 399, 999, 424

(56) References Cited

U.S. PATENT DOCUMENTS

| | | |
|---|---|---|
| 3,877,339 | 4/1975 | Muenchinger . |
| 3,910,588 | 10/1975 | Austin . |
| 4,193,434 | 3/1980 | Wagner . |
| 5,056,975 | 10/1991 | Ando . |
| 5,090,854 | 2/1992 | Hafeli et al. . |
| 5,282,710 | 2/1994 | Triesethau . |
| 5,333,978 | 8/1994 | Rives . |
| 5,462,395 | * 10/1995 | Damm et al. ................ 411/353 X |
| 5,782,595 | 7/1998 | Schneider . |
| 5,807,052 | 9/1998 | Van Boven et al. . |
| 5,871,319 | * 2/1999 | Schneider ................... 411/999 X |

FOREIGN PATENT DOCUMENTS

2390619 * 12/1978 (FR) ...................................... 411/155

* cited by examiner

Primary Examiner—Neill Wilson
(74) Attorney, Agent, or Firm—Lisa M. Soltis; Mark W. Croll; John P. O'Brien

(57) ABSTRACT

A threaded fastener having a threaded shaft with a head disposed on a portion thereof and a deflectable flange protruding outwardly from the shaft at or near the head. The deflectable flange has a generally concave surface facing toward a leading end of the fastener shaft. A protuberance is disposed on the shaft and spaced apart axially from the generally concave surface of the deflectable flange to limit compression of a fixture clamped between the fastener head and a work surface.

17 Claims, 2 Drawing Sheets

THREADED FASTENER AND ASSEMBLY

BACKGROUND OF THE INVENTION

The invention relates generally to fasteners, and more particularly to threaded fasteners and assemblies.

Threaded fastening systems comprising a bolt and a resilient cone shaped member that flexes or deflects when clamped between the bolt head and a work surface are known generally. The cone shaped member may be a discrete part, for example a washer, or may be formed unitarily with the bolt. See, for example, U.S. Pat. Nos. 3,877,339; 4,193,434; 5,056,975; 5,282,710; 5,333,978; and 5,807,052.

It is known generally in threaded fastening systems to pre-assemble a bolt with a workpiece, and to retain the bolt in an opening through the workpiece or through some other member, for example with an annular protrusion on the bolt shaft that cooperates with a constricted portion of the opening. See, for example, U.S. Pat. Nos. 4,193,434; 5,782,595; 5,807,052; and 5,871,319.

It is also known generally in threaded fastener systems to limit a clamping force applied to a fixture disposed between a fastener head and a work surface with a discrete load bearing sleeve member disposed about the fastener shaft between the fastener head and the work surface. See, for example, U.S. Pat. Nos. 4,139,434; 5,807,052; and 5,870,319.

The present invention is drawn toward advancements in the art of threaded fasteners.

An object of the invention is to provide novel threaded fasteners that overcome problems in the art.

Another object of the invention is to provide novel threaded fasteners that are reliable and economical.

Another object of the invention is to provide novel threaded fasteners for retaining fixtures on work pieces.

A further object of the invention is to provide novel threaded fasteners that are pre-assembled with fixtures prior to mounting the fixtures on work pieces.

Yet another object of the invention is to provide novel threaded fasteners having flanges that deflect upon engagement with a fixture.

Still another object of the invention is to provide novel threaded fasteners having a protruding member that limits clamping compression of the fixtures.

A more particular object of the invention is to provide novel threaded fasteners comprising generally a partially threaded shaft having a head disposed thereon and a deflectable flange protruding outwardly from the shaft at or near the head. The deflectable flange has a generally concave surface facing toward a leading end of the fastener shaft. A protuberance is disposed on the shaft and spaced apart axially from the concave surface of the deflectable flange.

Another more particular object of the invention is to provide novel threaded fasteners in combination with fixtures mountable on work pieces, comprising generally a fastener having an at least partially threaded shaft with a head, and a compression limiting member disposed on the shaft and extending outwardly beyond a diameter of the threaded portion thereof. The fastener shaft is disposable in an opening of the fixture, and the threaded shaft is engageable with a threaded bore of the work piece when the fixture is mounted thereon. The compression limiting member is spaced axially from the fastener head and is engageable with the workpiece when the fastener head is disposed against the fixture, whereby compression of the fixture is limited by engagement of the compression limiting member with the workpiece.

Yet another more particular object of the invention is to provide novel threaded fasteners pre-assembled with fixtures mountable on work pieces, comprising generally a shaft having a head and a threaded leading end portion, a deflectable flange protruding outwardly from the fastener shaft, the deflectable flange having a bottom side with a generally concave surface facing toward the leading end portion of the shaft, and a compression limiting member disposed on the shaft and extending outwardly beyond the threaded shaft diameter. The compression limiting member is spaced axially from the fastener head, and the fastener shaft is disposed, and in some embodiments retained, in an opening of the fixture.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
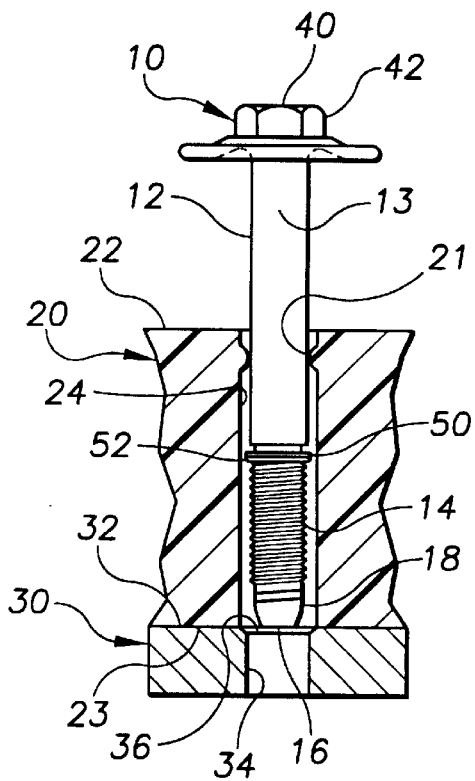
FIG. 1 is a partial sectional view of an exemplary fastener of the present invention pre-assembled with a fixture prior to installation of the fastener into a work piece.
Figure 2:
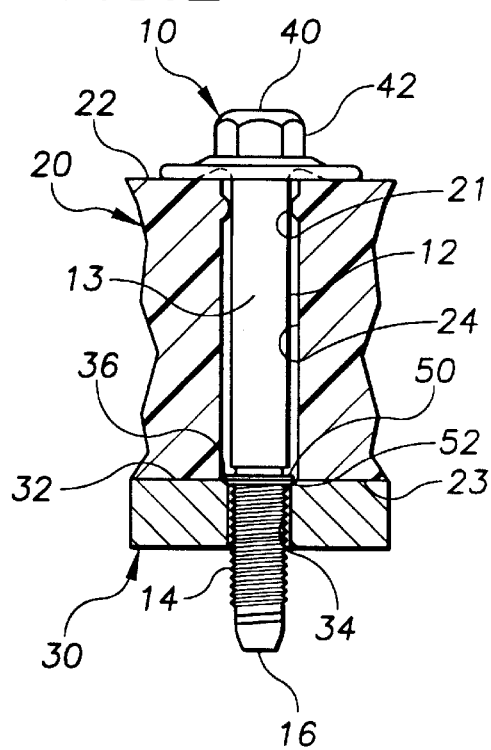
FIG. 2 is a partial sectional view of the fastener of FIG. 1 installed into the work piece and retaining the fixture thereon.

FIGS. 1 and 2 illustrate a threaded fastening system comprising generally a threaded fastener 10 for clamping and retaining a fixture 20 on a work piece 30.

The fixture 20 comprises generally a first side 22 and an opposite second mounting side 23 and an opening 24 therethrough, between the first and second sides thereof, for accommodating the fastener as discussed further below.

In FIG. 1, the work piece 30 comprises generally a mounting work surface 32 upon which the mounting surface of the fixture 20 is disposed or mounted and an at least partially threaded bore 34, into which a threaded portion of the fastener shaft is disposed to clamp and retain the fixture on the work piece, as discussed more fully below.

In one exemplary application, the fixture 20 is a somewhat resilient plastic manifold cover and the work piece 30 is a metal engine. More generally, however, the fixture may be any component of any material that requires mounting and retention on a work piece of any type.

In FIG. 1, the fastener 10 comprises a shaft 12 having leading and trailing end portions, and a screw thread 14 disposed on or about at least a portion thereof having a corresponding threaded shaft diameter. The leading end portion of the shaft includes a leading end 16, and in some embodiments a relatively reduced diameter pilot end portion, or dog, 18 extending therefrom to the screw threads 14 to facilitate the initial insertion and axial alignment of the fastener shaft in the threaded bore of the work piece.

The fastener 10 also comprises a head 40 disposed on a portion of the shaft 12, and in the exemplary embodiment on the very end thereof. The head 40 generally comprises a torque applying tool engagement surface, which is a circumferential wrenching surface 42 in the exemplary embodiment. Other head configurations may have alternative tool engagement portions thereon, for example a hex or some other opening on the end thereof.

In some embodiments, the head is disposed on the shaft with a portion of the trailing end portion of the shaft extending axially through the head, whereby portions thereof emanate axially from opposing ends of the head.

The fastener also comprises generally a compression limiting member or protuberance disposed on the fastener shaft and extending outwardly beyond the threaded shaft diameter thereof. The compression limiting member is spaced apart axially from the fastener head and is engageable with the work piece to limit compression of the fixture between the fastener head and the work piece, as discussed more fully herein below.

In the exemplary embodiment of FIG. 1, the compression limiting member is a generally radially protruding continuous annular member 50 having a shoulder 52 facing generally toward the leading end 16 of the fastener shaft. In other alternative embodiments, the compression limiting member may be a shoulder formed by a relatively large diameter shaft portion or by one or more discrete protrusions disposed about the shaft.

In FIG. 2, the fastener shaft 12 is disposed in the fixture opening 24 and the threaded portion 14 of the fastener shaft is engageable with the threaded bore 34 of the work piece when the second side 23 of the fixture 20 is mounted on the work surface 32 and the fixture opening 24 is aligned with the threaded bore 34.

In FIG. 1, the compression limiting member is generally engageable with the workpiece 30 when the fastener head 40 is disposed against the first side 22 of the fixture 20. In the exemplary embodiment of FIG. 2, the shoulder 52 is engaged with a recessed seat portion 36 disposed about the threaded bore 34 of the workpiece 30 when the fastener head 40 clamps the fixture 20 against the work surface 32, thereby limiting deformation of the fixture. In other embodiments, however, the compression limiting member 50 directly engages the work surface 32 of the work piece 30 rather than the recessed portion 36 thereof.

The axial spacing between the compression limiting member 50 and the fastener head 40 is selected generally to permit a specified amount of clamping and deformation of the fixture 20 between the fastener head 40 and the work piece 30 before the compression limiting member engages the workpiece and limits the axial advancement of the fastener, thereby limiting further deformation of the fixture.

Figure 3:
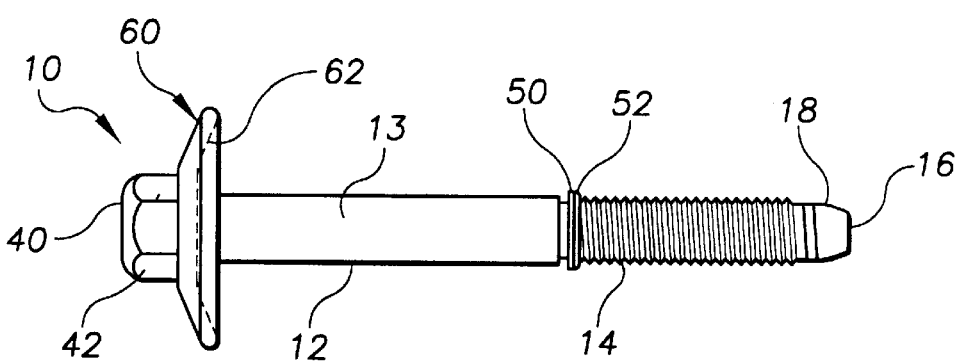
FIG. 3 is another exemplary fastener of the present invention.

In the embodiments of FIGS. 1–3, the compression limiting member or protuberance 50, which is in the exemplary form of an annular member, has a diameter greater than a diameter of a fastener shaft portion 13 between the fastener head 40 and the annular member.

In FIGS. 1 and 2, the fixture 20 has an opening protuberance in the exemplary form of a radially inwardly protruding annular member 21 disposed on the opening 24 thereof. A diameter of the opening 24 at the opening protuberance is constricted so that it is less than the diameter of the protuberance 50. When the fastener shaft 12 is disposed into the fixture opening 24, the opening protuberance 21 is disposed between the fastener head 40 and the annular member 50 to retain the threaded fastener 10 to the fixture 20, which is desirable in some applications.

In the exemplary embodiment, the shoulder 52 of the protuberance 50 has a beveled or chamfered surface, which facilitates insertion of the fastener protuberance into the fixture opening 24 and through the constricted diameter portion thereof formed by the opening protuberance 21.

In one embodiment, the fixture 20 and the opening protuberance 21 thereof are formed of a resilient plastic material. The opening protuberance 21 is thus deformable to permit passage of the fastener protuberance 50 through the constricted portion of the opening 24 during assembly of the fastener 10 and fixture 20.

In some applications, for example the exemplary manifold cover application, is it desirable for the diameter of the fastener shaft portion 13 to be less than the constricted fixture opening diameter at the opening protuberance 21, thereby permitting lateral movement of the fastener within the opening 24. Lateral movement of the fastener within the fixture opening 24 is desirable in some applications to ensure proper alignment of the fastener shaft with the threaded bore 34 of the work piece during mounting.

It is also desirable in some applications, including the exemplary manifold cover application, for the axial distance between the opening protuberance 21 and the second side 23 of the fixture 20 to be greater than or equal to, and in other words not less than, an axial distance between the protuberance 50 and the leading end 16 of the fastener shaft. Such a configuration permits axial retraction of the fastener shaft 12 into the fixture opening 24 sufficiently far to prevent the fastener end 16 from protruding axially beyond the second side 23 of the fixture, as illustrated in FIG. 1. The second side of the fixture may thus be mounted flushly against the work surface with the fastener disposed in the fixture opening without prior alignment of the fixture opening with the threaded bore of the work piece.

In FIG. 3, the fastener 10 also comprises a deflectable flange 60 protruding radially outwardly from the fastener shaft 12, preferably from or adjacent to the fastener head 40. The deflectable flange 60 includes a bottom side with a generally concave surface 62, which may have a conical or curved or other concave surface. The flange 60 deflects when engaged with the first side 22 of the fixture 20 upon loading of the fastener. The exemplary fastener heads of FIGS. 1 and 2 are configured similarly to the fastener of FIG. 3, but other fastener embodiments may include heads without the deflectable flange.

Figure 5:
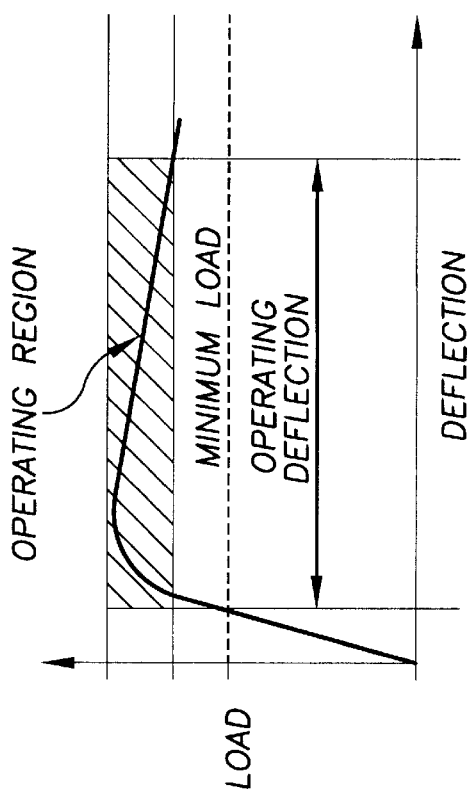
FIG. 5 is a graphical illustration of a load deflection curve.

FIG. 5 illustrates graphically a load versus deflection curve for a fastener having a deflectable flange and the corresponding operating region thereof. In the exemplary manifold mounting application, the deflectable flange is designed to yield by deflection or deformation thereof upon clamping against the plastic manifold without over-stressing the plastic.

In the exemplary embodiment, the fastener 10 is a unitary member, wherein the deflectable flange 60 is formed unitarily with the fastener head 40 and the compression limiting member 50 is formed unitarily with the fastener shaft 12. In one exemplary embodiment suitable for applications where the fixture is plastic, the unitary fastener is formed of a soft metal, for example a Grade 5.8 material without stress relief. In other applications, it may be desirable to stress relieve the fastener to reduce its strength, and in still other applications it may be desirable to heat treat the fastener to increase its strength.

In an alternative embodiment, the deflectable flange 60 is a discrete or separate member, for example in the general form of a washer having a concave surface on one side thereof, which is assembled about the fastener shaft.

In embodiments that include a deflectable member 60 and a compression limiting member 50, as in FIG. 3, the axial spacing between the compression limiting member 50 and the generally concave surface 62 of the deflectable member is selected generally to permit a specified amount of deflection of the deflectable member 60 and a specified amount of deformation of the fixture 20 before the compression limiting member 50 engages the workpiece to limit the axial advancement of the fastener and further clamping of the fixture.

Figure 4:
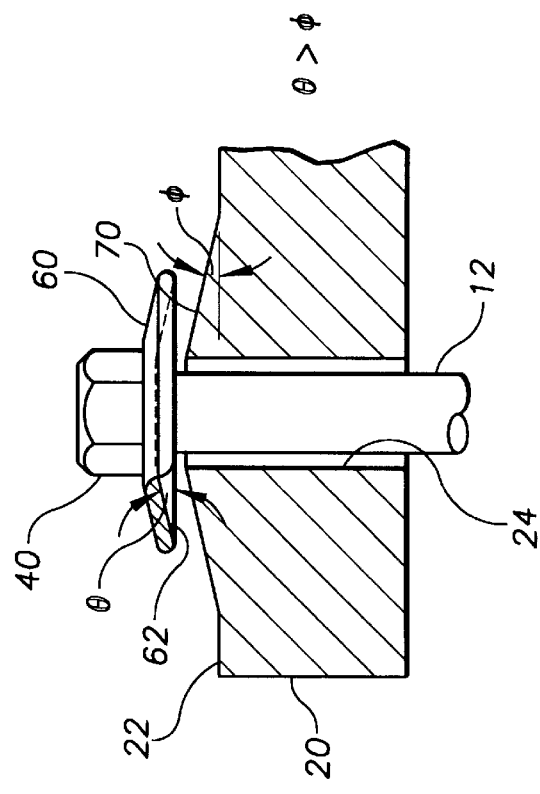
FIG. 4 is an exemplary fastener system of the present invention.

FIG. 4 illustrates a boss 70 disposed about the opening 24 of the fixture 20 on the first side 22 thereof. The boss 70 preferably has a surface configuration that is complementary to the generally concave surface 62 of the deflectable flange 60 upon deflection thereof. When the flange 60 is deflected an amount limited by the compression limiting member, the concave bottom surface 62 thereof preferably mates flushly against the complementary boss 70 thereby distributing the load over a greater surface area of the fixture, which is desirable in applications where over-stressing the fixture is to be avoided, for example in the exemplary plastic manifold mounting application.

In the exemplary embodiment, the concave surface 62 of the deflectable flange 60 is generally conical with an angle θ. The exemplary boss 70 has a generally conical convex shape characterized by a sloping rise with an angle φ that is less that the angle θ prior to deflection of the flange 60. Upon deflection of the flange 60 to some degree, that is preferably limited by engagement of the compression limiting member with the work piece as discussed above, the boss has a surface configuration complementary to that of the concave surface 62 of the deflected flange, and is mountable on the boss, which distributes the load on the fixture.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A threaded fastener comprising:
   a shaft having a head on a portion thereof and an at least partially threaded portion with a threaded shaft diameter,
   a deflectable flange formed unitarily with the fastener head and protruding radially outwardly from the fastener shaft the deflectable flange having a generally concave surface facing toward a leading end portion of the shaft,
   a compression limiting member formed unitarily with the fastener shaft, the compression limiting member disposed on the shaft and extending outwardly beyond the threaded shaft diameter,
   the compression limiting member axially separated from the fastener head.

2. The fastener of claim 1 in combination with a fixture having first and second opposite sides and an opening therebetween, the compression limiting member is an annular member having a diameter greater than a diameter of a fastener shaft portion between the fastener head and the annular member, the fixture has an opening protuberance disposed on the opening thereof, a diameter of the fixture opening at the opening protuberance is less than the diameter of the annular member.

3. The fastener of claim 2, the fastener shaft disposed in the fixture opening with the fastener head disposed on the first side of the fixture, the opening protuberance disposed between the fastener head and the annular member, an axial distance between the opening protuberance and the second side of the fixture is not less than an axial distance between the annular member and a leading end of the fastener shaft.

4. The fastener of claim 3, the diameter of the fixture opening at the opening protuberance is greater than the diameter of the fastener shaft portion between the fastener head and the annular member.

5. A threaded fastener comprising:
   a shaft having a head and a screw thread formed on a portion of the shaft toward a leading end thereof;
   a deflectable flange protruding radially outwardly from the shaft and formed unitarily therewith, the deflectable flange having a generally concave surface facing toward the leading end of the shaft;
   a protuberance disposed on the shaft and formed unitarily therewith, the protuberance spaced apart axially from the concave surface of the deflectable flange.

6. The fastener of claim 5, the threaded shaft portion having a threaded shaft diameter, the protuberance extends radially outwardly beyond the threaded shaft diameter.

7. The fastener of claim 6, the protuberance includes a shoulder disposed toward the leading end of the shaft, the shoulder spaced apart axially from the generally concave surface of the deflectable flange.

8. The fastener of claim 7, the deflectable flange is an annular flange member protruding from the head portion.

9. The fastener of claim 8, the deflectable flange and the protuberance are formed unitarily with the shaft.

10. A threaded fastener pre-assembled with a fixture mountable on a work piece, comprising:
    an opening through the fixture between first and second opposite sides thereof;
    the fastener having a shaft with a head and an at least partially threaded portion with a-threaded shaft diameter toward a leading end of the shaft;
    a deflectable flange protruding outwardly from the fastener shaft, the deflectable flange having a generally concave surface facing toward the leading end of the shaft;
    a compression limiting member disposed on the shaft and extending outwardly beyond the threaded shaft diameter, the compression limiting member spaced apart axially from the deflectable flange;
    the fastener shaft disposed in the opening of the fixture, and the generally concave surface of the deflectable member engageable with the first side of the fixture about the opening thereof.

11. The assembly of claim 10, a boss disposed about the opening of the fixture on the first side thereof, a surface configuration of the boss is complementary to the generally concave surface of the deflectable flange upon deflection thereof, the generally concave surface of the deflectable flange is engageable with the boss.

12. The assembly of claim 10, the deflectable flange is formed unitarily with the fastener head and the compression limiting member is formed unitarily with the fastener shaft.

13. The assembly of claim 12, the fastener is metal and the fixture is plastic.

14. The assembly of claim 10, the compression limiting member is an annular member having a diameter greater than a diameter of a fastener shaft portion between the fastener head and the annular member, the fixture has an opening protuberance disposed on the opening thereof, a diameter of the opening at the opening protuberance is less than the diameter of the annular member.

15. The assembly of claim 14, the opening protuberance of the fixture disposed between the fastener head and the annular member, an axial distance between the opening protuberance and the second side of the fixture is not less than an axial distance between the annular member and the leading end of the shaft.

16. The assembly of claim 15, the diameter of the opening at the opening protuberance is greater than the diameter of the fastener shaft portion between the fastener head and the annular member.

17. The assembly of claim 10, the fastener is soft metal and the fixture is plastic.

\* \* \* \* \*